United States Patent

[11] 3,616,245

| [72] | Inventors | Edward O. Stapley<br>Metuchen;<br>Marion Jackson, Cranford; Jerome<br>Birnbaum, Morganville, all of N.J. |
|---|---|---|
| [21] | Appl. No. | 795,348 |
| [22] | Filed | Jan. 30, 1969 |
| [45] | Patented | Oct. 26, 1971 |
| [73] | Assignee | Merck & Co., Inc.<br>Rahway, N.J. |

[54] IMPROVED FERMENTATION PROCESSES FOR PRODUCING (−) (cis-1,2-EPOXYPROPYL)-PHOSPHONIC ACID
4 Claims, No Drawings

[52] U.S. Cl. .................................... 195/80,
195/114
[51] Int. Cl. ..................................... C12d 9/00
[50] Field of Search ........................... 195/80, 114

[56] References Cited
UNITED STATES PATENTS
3,386,889  6/1968  Moses et al. ................. 195/80 X FOREIGN PATENTS
1,046,047  12/1958  Germany..................... 424/203

OTHER REFERENCES

Churi et al., J. of Am. Chem. Soc. 83, 1966, pp. 1824–5
Chemical Abstracts, 62 (1965), 10457(f)
Derwent Farmdoc #35893, Abstracting BE718,507, Publ. Jan. 24, 1969
Levine et al., " A Compilation of Culture Media," 1930, The Williams & Wilkins Co., Baltimore, pp. 19(#53), 32(#98), 74(#243), 106(#371), 110(#383), 175(#617) (copy in group 172)

*Primary Examiner*—Joseph M. Golian
*Attorneys*—J. Jerome Behan and John Frederick Gerkens ABSTRACT: Increased yields of the antibiotic (−)(cis-1,2-epoxypropyl)-phosphonic acid are obtained by the addition of certain carboxylic acids to fermentation media. The antibiotic which is produced by growing newly found strains of Streptomyces on suitable fermentation media is active against both gram-positive and gram-negative bacteria.

IMPROVED FERMENTATION PROCESSES FOR PRODUCING(−) (cis-1,2-EPOXYPROPYL)-PHOSPHONIC ACID

DESCRIPTION OF THE PREFERRED EMBODIMENTS

The invention relates to the production of a new and useful antibiotic known chemically as (−)(cis-1,2-epoxypropyl)-phosphonic acid and, in particular, to an improved method for the production of the antibiotic by fermentation of nutrient media with suitable strains of micro-organisms such as, for example, Streptomyces.

The antibiotic is produced during the aerobic fermentation of suitable aqueous nutrient media under controlled conditions. Aqueous media such as those employed for the production of other antibiotics are suitable for producing (−)(cis-1,2-epoxypropyl)-phosphonic acid. Such media contain sources of carbon and nitrogen which are assimilable by the micro-organism, and inorganic salts. In addition, the fermentation media contain traces of metals necessary for the growth of the micro-organism which are commonly supplied as impurities incidental to the other constituents of the medium. In general, carbohydrates such as sugars, for example dextran, maltose, galactose, glucose and the like, and starches such as grains, for example oats and rye, corn starch, corn meal, and the like, can be used either alone or in combination as sources of assimilable carbon in the nutrient medium. The exact amount of the carbohydrate source or sources utilized in the medium will depend in part upon the other ingredients of the medium. It has been found, however, that an amount of carbohydrate between about 1 and 6 percent by weight of the medium is sufficient. A single carbon source may be used, or several carbon sources may be combined in the medium.

Satisfactory nitrogen sources include myriad proteinaceous materials such as various forms of hydrolysates of casein, soybean meal, corn steep liquor, distillers solubles, yeast hydrolysates, tomato paste, and the like. The various sources of nitrogen can be used either alone or in combination, and are used in amounts ranging from 0.2–6 percent by weight of the aqueous medium.

(−)(Cis-1,2-epoxypropyl)-phosphonic acid is formed by growing, under controlled conditions, strains of micro-organisms such as, for example, those strains of the genus Streptomyces which produce the antibiotic. One such micro-organism, which was isolated from soil, has been designated MA-2898 in the culture collection of Merck & Co., Inc., Rahway, N.J.; subisolates from the parent culture have been designated MA-2911, MA-2912, and MA-2913. These cultures have been placed on permanent deposit with the culture collection of the Northern Utilization Research & Development Branch of the U.S. Department of Agriculture at Peoria, Ill. and have been assigned the culture numbers NRRL B-3357, NRRL B-3358, NRRL B-3359, and NRRL B-3360, respectively. These micro-organisms have been classified in the species Streptomyces fradiae.

The antibiotic is also produced by growing, under controlled conditions, other strains of Streptomyces also isolated from soil and identified in the Merck & Co., Inc. culture collection as cultures MA-2867, MA-2903, MA-2916, MA-2917, and MA-3270. These cultures have been classified as members of the species Streptomyces viridochromogenes. Cultures MA-2903, MA-2867, MA-2916, MA-2917, and MA-3270 have been placed on permanent deposit with the culture collection of the Northern Utilization Research and Development Division of the U.S. Department of Agriculture and have been assigned the culture numbers NRRL-3413, NRRL-3414, NRRL-3415, NRRL-3416, and NRRL-3427, respectively.

Culture MA-3269 has been assigned to the species Streptomyces wedmorensis and has been assigned an NRRL number of 3426.

In addition to the above species of micro-organisms, also contemplated is the use of other micro-organisms, including strains of Streptomyces either isolated from nature or obtained by mutation of these organisms, such as those obtained by natural selection or those produced by mutating agents, such as, for example, X-ray irradiation, ultraviolet irradiation, nitrogen mustards, and the like.

Due to the inherent difficulty in separating pure (−)(cis-1,2-epoxypropyl)-phosphonic acid from the large quantities of impurities in the fermentation broth, it is of great importance to find a way to increase the concentration of the antibiotic relative to the total broth solids.

By the present invention, it has been demonstrated that the addition of one or more of certain carboxylic acids or salts thereof to fermentation media containing a micro-organism capable of producing (−)(cis-1,2-epoxypropyl)-phosphonic acid will enhance the production of the antibiotic. In particular, the addition of organic acids such as glutamic, fumaric, succinic, $\alpha$-ketoglutaric, malic, oxalacetic, aconitic and isocitric acids to fermentation media results in a significant increase in the production of the antibiotic. Some stimulatory effect is observed when other carboxylic acids such as acetic and pyruvic acids are employed. In the case of acetic and pyruvic acids, however, a more pronounced effect is obtained where the acids are employed in the presence of one of the other acids such as, for example, glutamic acid, than is observed when either acid is used alone. The amount of the carboxylic acid needed to stimulate production of the antibiotic varies depending upon the particular acid and the medium employed. The actual concentration of the acid employed in a given formulation medium will vary, depending upon the particular micro-organism used and the fermentation conditions employed. Improved production of the antibiotic has been observed in media containing from about 0.6 millimoles to about 30.0 millimoles per liter of the carboxylic acid. It is preferred, however, to employ from about 3.0 millimoles to about 12 millimoles per liter of the carboxylic acid in order to obtain good production of the antibiotic. All of the acids within the scope of the invention stimulate production of the antibiotic but have no significant stimulating or inhibitory effect on the growth of the micro-organism.

The carboxylic acids within the scope of the present invention may be employed in any fermentation medium containing a micro-organism which is capable of producing (−)(cis-1,2-epoxypropyl)-phosphonic acid. The carboxylic acid to be employed as a production stimulant is added preferably in the form of a water soluble inorganic salt such as, for example, the sodium, potassium, or calcium salt, although the free acid may also be employed. The carboxylic acid may also be added in the form of a naturally occurring carboxylic acid salt or a complex, such as may be present in microbial nutrients which are rich in the particular acid or acids to be employed. The usual nutrients include a source of assimilable carbon, a source of assimilable nitrogen, inorganic salts, and growth factors when required. A single acid may be employed to stimulate production, but a particular acid may be used in the presence of one or more of the other acid stimulants, said stimulants being present in the fermentation medium as a nutrient, or as an additional additive. Where more than one of the acids falling within the scope of this invention is employed to stimulate production of the antibiotic, a greater stimulus to the production of the antibiotic is obtained than is obtained where a single acid is employed. For example, where sodium glutamate and sodium fumarate are added to the medium in a concentration of about 6.0 millimoles per liter, the amount of antibiotic in the broth is assayed at 23.8 $\mu$g./ml. as compared with an assay of 16.2 $\mu$g./ml. for sodium glutamate and 18.6 $\mu$g./ml. for sodium fumarate when the later acids are used alone. Also contemplated is the use of the carboxylic acids in the presence of other compounds which stimulate the production of (−)(cis-1,2-epoxypropyl)-phosphonic acid such as, for example, cobalt and phosphorous.

Although the new antibiotic of this invention is produced by both surface and submerged cultures, it is presently preferred to carry out the fermentation in the submerged state. Small scale fermentations are conveniently carried out by placing suitable quantities of nutrient medium in flasks, sterilizing the flasks and contents by heating to 120° C., inoculating the flasks with either spores or a vegetative cellular growth of a (−)(cis-1,2-epoxypropyl)-phosphonic acid producing microorganism, for example, a strain of *Streptomyces*, loosely stoppering the necks of the flasks with cotton, and permitting the fermentation to proceed in a constant temperature room at about 28° C. for 3–5 days. For larger scale work it is preferable to conduct the fermentation in suitable tanks provided with an agitator and a means of aerating the fermentation medium. In this method, the nutrient medium is made up in the tank and sterilized by heating at 120° C. After cooling, the sterilized medium is inoculated with a suitable source of vegetative cellular growth of the micro-organism and the fermentation is permitted to proceed for 2–4 days while agitating and/or aerating the nutrient medium and maintaining the temperature at about 28° C. This method of producing (−)(cis-1,2-epoxypropyl)-phosphonic acid is particularly suited for the preparation of large quantities of the new antibiotic.

The fermentation using the (−)(cis-1,2-epoxypropyl)-phosphonic acid producing micro-organism can be carried out at temperatures ranging from about 20° - 40° C. For optimum results, however, it is more convenient to conduct the fermentations at temperatures between 26° and 30° C.

The pH of the nutrient media suitable for growing the micro-organism and producing the antibiotic may vary from about 5.0 to 9.0. The preferred pH range, however, is from about 6.0 to 7.5.

In carrying out the fermentation process, a cell suspension is prepared by the addition of sterile medium to an agar slant culture of a (−)(cis-1,2-epoxypropyl)-phosphonic acid producing micro-organism. Growth from the slant culture is then used to inoculate a seed flask and the seed flask is shaken at about 28° C. for 1–3 days in order to obtain good growth. The seed flask is then used to inoculate the production flasks. Alternatively, the seed flask can be inoculated from a lyophilized culture or a frozen inoculum.

The inoculation is generally carried out using about 1 ml. per 30 ml. of production medium containing the desired concentration of the carboxylic acid, and the fermentation is permitted to proceed for 2–4 days while agitating and/or aerating the nutrient medium and maintaining the temperature at about 28° C. All of the production flasks, i.e., those containing a production stimulant and the flasks used as controls, are then assayed, generally after 3–4 days, to determine the amount of antibiotic produced in each flask.

(−)(cis-1,2-epoxypropyl-phosphonic acid is conveniently assayed by a disc plate procedure using *Proteus vulgaris* MB-838 (ATCC 21100 and NRRL B-3361) as the test organism. The test culture is maintained as a slant culture on nutrient agar (Difco) plus 0.2 percent yeast extract (Difco). The inoculated slants are incubated at 37° C. for 18–24 hours and stored at refrigerator temperatures until used; fresh slants are prepared each week.

The inoculum for the assay plates is prepared each day by inoculating a 250 ml. Erlenmeyer flask containing 50 ml. of nutrient broth (Difco) plus 0.2 percent yeast extract (Difco) with a scraping from the slant. THe flask is incubated on a shaking machine at 37° C. for 18–24 hours. The broth culture is then adjusted to 40° transmittance at a wave length of 660 m$\mu$, using a Bausch & Lomb Spectronic 20 by the addition of 0.2 percent yeast extract solution to the growth.

Uninoculated broth is used as a blank for this determination. 30 ml. of the adjusted broth is used to inoculate 1 liter of medium.

Nutrient agar (Difco) plus 0.2 percent yeast extract (Difco) is used as the assay medium. This medium is prepared, sterilized by autoclaving, and allowed to cool to 50° C. After the medium is inoculated, 10 ml. is added to sterile petri dishes and the medium is allowed to solidify.

The activity is expressed in terms of units, a unit being defined as the concentration of the antibiotic per milliliter which on a ½-inch paper disc will produce a zone diameter of 28 mm.. Four concentrations of the antibiotic are employed for the preparation of the standard curve, namely, 0.3, 0.4, 0.6, and 0.8 units per milliliter; each concentration being obtained by the dilution in 0.05 M tris-(hydroxymethyl)-aminomethane buffer adjusted to pH 8.0. Four discs are placed on each of the five plates for the preparation of the standard curve, each plate containing one disc of each of the four concentrations of antibiotic shown above. The plates are incubated for 18 hours at 37° C., and the diameters of the zones of inhibition in millimeters are measured. An average zone diameter for each concentration is calculated, from which a standard curve is prepared on semilog graph paper. The slope of the line obtained is between 4 and 5.

The production flasks are then assayed by diluting the sample in 0.05 molar buffer at pH 8 to an appropriate concentration. THe test organism is *Proteus vulgaris* MB-838, and the assay medium is nutrient agar plus 0.2 percent yeast extract. Where either the disc plate or cylinder plate assay is employed, from 10–15 ml. of the medium is poured per plate. Where the disc plate procedure is employed, the discs are dipped into 0.4 units per milliliter of the antibiotic solution and are placed on the plate in a position alternate to the sample. The plates are then incubated at 37° C. for 18 hours, and the zone diameters in millimeters are determined. Where the cylinder plate procedure is employed, six cylinders, three of the sample and three of the control solution, are used per plate, alternating the sample and control solution. The control solution contains 1 $\gamma$/ml. of the free acid. Five standard plates containing six levels of the standard ranging from 0.25 $\gamma$/ml. to 3.0 $\gamma$/ml. are employed. The assay is calculated by means of a Nomograph, and the results are reported in terms of units or gamma per milliliter. One unit of the free acid is equal to 2.8 $\gamma$.

The antibiotic can be purified and recovered in purer form by a number of procedures. One such procedure comprises adsorbing the antibiotic on alumina; either basic or acid-washed alumina is suitable for this purification.

The adsorbed antibiotic can be eluted from under alumina most conveniently by aqueous or aqueous-alcoholic ammonium hydroxide solutions having a pH of about 11.2 and fractionally collecting the eluate. Purification of impure solid fractions containing the ammonium salt of (−)(cis-1,2-epoxypropyl)-phosphonic acid can also be effected by dissolving such material in methanol, adding an equal volume of n-butanol, evaporating off the methanol, filtering off any butanol-insoluble material, and recovering a butanol solution containing the ammonium salt of the antibiotic of enhanced purity. The ammonium salt can then be obtained in solid form by evaporating the butanol solution to dryness under reduced pressure. Alternatively, the ammonium salt can be extracted from the butanol solution with water to obtain an aqueous solution of the ammonium salt of (−)(cis-1,2-epoxypropyl)-phosphonic acid. The calcium salt of the antibiotic is produced by adding calcium hydroxide to the aqueous solution under reduced pressure. Alternatively, the calcium salt is also obtained by passing a solution of another salt of the antibiotic over a cation exchange resin on the calcium cycle. The calcium salt crystallizes from aqueous solutions having a concentration of 10 mg./ml. upon standing or with agitation.

(−)(cis-1,2-epoxypropyl)-phosphonic acid and its salts are useful antimicrobial agents, which are active in inhibiting the growth of both gram-positive and gram-negative pathogenic bacteria. This antibiotic and particularly its salts, are active against Bacillus, Escherichia, Staphylococci, Salmonella, and Proteus pathogens, and antibiotic-resistant strains thereof. Illustrative of such pathogens are *Escherichia coli, Salmonella schottmuelleri, Salmonella gallinarum, Proteus vulgaris, Proteus mirabilis, Proteus morganii,* and *Staphylococcus aureus*. Thus, (−)(cis-1,2-epoxypropyl)-phosphonic acid and salts thereof can be used as antiseptic agents to remove susceptible organisms from pharmaceutical, dental, and medical equipment and other areas subject to infection by such organisms. Similarly, they can be used to separate certain micro-organisms from mixtures of micro-organisms. Salts of (−)(cis-1,2-epoxypropyl)-phosphonic acid are also useful in the treatment of diseases caused by bacterial infections in man and animals and are particularly valuable in this respect, since they are active against resistant strains of pathogens. These salts are especially valuable, since they are effective when given orally, although they can also be administered parenterally.

The following examples are given for purposes of illustration and not by way of limitation:

EXAMPLE 1

A loopful of cells from an agar slant culture of *Streptomyces fradiae* NRRL B–3360 of the following composition:

A.

| SLANT MEDIUM | AMOUNT |
| --- | --- |
| Corn starch | 10.0 grams |
| Asparagine | 1.0 grams |
| $K_2HPO_4$ | 1.0 grams |
| Agar | 20.0 grams |
| $H_2O$ | 1000 ml. | pH=7.0 was used to inoculate a 250 ml. baffled Erlenmeyer flask containing 40 ml. of seed medium of the following composition:

B.

| SEED MEDIUM | AMOUNT |
| --- | --- |
| Corn starch | 10.0 grams |
| Asparagine | 1.0 grams |
| $K_2HPO_4$ | 1.0 grams |
| $H_2O$ | 1000 ml. | pH=7.0

The inoculated flask was incubated at 28° C. for 2 days on a 220 r.p.m. rotary shaker with a 2-inch throw.

Eight 250 ml. Erlenmeyer flasks were prepared, each containing 30 ml. of medium of the following composition:

C.

| PRODUCTION MEDIUM | AMOUNT |
| --- | --- |
| Corn starch | 20.0 grams |
| $K_2HPO_4$ | 0.5 grams |
| Asparagine | 5.0 grams |
| $CaCl_2 \cdot H_2O$ | 0.5 grams |
| NaCl | 0.5 grams |
| $MgSO_4 \cdot H_2O$ | 0.2 grams |
| $FeSO_4 \cdot H_2O$ | 0.03 grams |
| Trace element mix no. 2* | 10 ml. |
| Sodium ascorbate | 0.5 grams |
| Sodium citrate | 1.0 grams |
| Distilled $H_2O$ | 1000 ml. | pH=7.0

*

FORMULA, TRACE ELEMENT MIX NO. 2:

| $FeSO_4 \cdot 7H_2O$ | 1.0 grams |
| --- | --- |
| $MnSO_4 \cdot H_2O$ | 1.0 grams |
| $CuCCl_2 \cdot 2H_2O$ | 25 mg. |
| $CaCl_2$ | 100 mg. |

Table — Continued

| $H_3BO_3$ | 56 mg. |
| --- | --- |
| $(NH_4)_6MO_7O_{24} \cdot 4H_2O$ | 19 mg. |
| $ZnSO_4 \cdot H_2O$ | 200 mg. |
| Distilled $H_2O$ | 1000 ml. |

An aqueous solution of monosodium glutamate was then added to the flasks to give a final concentration of monosodium glutamate as listed in the table below. These flasks were sterilized, cooled and inoculated by adding 1.0 ml. of the seed medium prepared as described above. The inoculated flasks were incubated at 28° C. on a rotary shaker operating at 220 r.p.m. with a 2-inch throw, and one flask was removed after three days; another flask was removed after 4 days incubation The contents of each flask were centrifuged at 8,500 r.p.m. for 10 minutes, and the broth was decanted from the solids. The supernatant broths were assayed using *Proteus Vulgaris* MB–838 as the test organism. The assays with the broth obtained after incubation for 3 and 4 days are shown below:

| Medium | g./l., D-L methionine | g./l., monosodium glutamate | pH | 3 day, growth estimate | Antibiotic units/ml. | |
| --- | --- | --- | --- | --- | --- | --- |
| | | | | | 3 day | 4 day |
| Basal production | 0 | 0 | 8.1 | +3 | 0 | 0.1 |
| Do | 0 | 1.0 | 8.5 | +3 | 0 | 0.29 |
| Do | 1.0 | 0 | 7.9 | +3 | 0 | 0.1 |
| Do | 1.0 | 1.0 | 8.4 | +3 | 0.52 | 0.51 |

One unit equals 2.8 μg./ml. of the free acid.

As illustrated above, using the basal medium, production of (−)(cis-1,2-epoxypropyl)-phosphonic acid is increased from 0.1 to 0.29 units/ml. upon addition of monosodium glutamate. Using the basal medium plus D-L methionine, production of (−)(cis-1,2-epoxypropyl)-phosphonic acid increased from 0.1 to 0.52 units/ml. upon addition of monosodium glutamate.

EXAMPLE 2

A loopful of cells from an agar slant culture of *Streptomyces fradiae* NRRL B–3360 of the following composition:

A.

| SLANT MEDIUM | AMOUNT |
| --- | --- |
| Cornstarch | 1% |
| L-asparagine | 0.1% |
| $K_2HPO_4$ | 0.1% |

2% agar slant culture was added to 40 ml. of sterilized seed medium in a 250 ml. baffled Erlenmeyer flask of the following composition:

B.

| SEED MEDIUM | AMOUNT |
| --- | --- |
| Cornstarch | 2% |
| L-asparagine | 0.5% |
| Monosodium-L-glutamate | 0.1% |
| Sodium citrate | 0.4% |
| $K_2HPO_4$ | 0.1% |
| $CaCl_2 \cdot H_2O$ | 0.05% |
| $MgSO_4 \cdot H_2O$ | 0.02% |
| $CoCl_2 \cdot H_2O$ | 0.01% |
| Distilled $H_2O$ | | pH=7.0

A trace element solution was added to give the following minimal concentrations:

FORMULA, TRACE ELEMENT:

| | |
|---|---|
| MnSO₄·7H₂0 | 10 mg./l. |
| CuCl₂·H₂0 | 0.25 mg./l. |
| FeSO₄·H₂0 | 10 mg./l. |
| H₃BO₃ | 0.56 mg./l. |

The inoculated flask was incubated at 28° C. for 3 days and then stored at 5° C. until used.

Two 250 ml. Erlenmeyer flasks were prepared, each containing 30 ml. of medium of the following composition:

C.

| PRODUCTION MEDIUM | AMOUNT | |
|---|---|---|
| Cornstarch | 2% | |
| L-asparagine | 0.5% | |
| Sodium citrate | 0.4% | |
| K₂HPO₄ | 0.1% | |
| CaCl₂·H₂0 | 0.05% | |
| MgSO₄·H₂0 | 0.02% | |
| CoCl₂·H₂0 | | 0.01% |
| Trace element** | | |
| Distilled H₂0 | | | pH=7.0

**As defined above

An aqueous solution of monosodium glutamate was then added to the flasks to give a final concentration of 0.1 percent. These flasks were sterilized, cooled and inoculated by adding 1.0 ml. of the seed medium prepared as described above. The inoculated flasks were incubated at 28° C. on a rotary shaker operating at 220 r.p.m. with a 2-inch throw, and the flask was removed after 4 days. When the fermentation was complete, the cells were removed by centrifugation and the broth was diluted with 0.05 M tris buffer (pH 8.0). The concentration of the antibiotic produced in the fermentation broth was determined by the standard biological assay method. The assay organism used was *Proteus vulgaris* MB-838. The results of three fermentations carried out in this manner are described below:

D.

| Experiment No. | Added Monosodium Glutamate | Antibiotic γ/ml. 4 Days |
|---|---|---|
| I | 0 | 13.2 |
| | 0.1% | 19.6 |
| II | 0 | 15.9 |
| | 0.1% | 25.8 |
| III | 0 | 11.1 |
| | 0.1% | 16.9 |

EXAMPLE 3

A loopful of cells from a 7-day old slant culture of *Streptomyces fradiae* NRRL B-3360 of the following composition:

A.

| SLANT MEDIUM | AMOUNT |
|---|---|
| Cornstarch | 1.0% |
| L-asparagine | 0.1% |
| K₂HPO₄ | 0.1% |
| Agar | 2.0% | pH=7.0 was used to inoculate a 250 ml. three-baffled Erlenmeyer flask containing 40 ml. of seed medium of the following composition:

B.

| SEED MEDIUM | AMOUNT |
|---|---|
| Cornstarch | 2.0% |
| L-asparagine | 0.4% |
| D-L methionine | 0.1% |
| Monosodium glutamate | 0.1% |
| Sodium citrate | 0.4% |
| K₂HPO₄ | 0.1% |
| CaCl₂·H₂0 | 0.05% |
| MgSO₄·H₂0 | 0.02% |
| CoCl₂·H₂0 | 0.01% |
| FeSO₄·H₂0 | 0.001% |
| Trace elements*** | | pH=7.0

***As defined below

***

FORMULA, TRACE ELEMENTS:

| | mg./l. |
|---|---|
| MnSO₄·4H₂0 | 10 |
| CuCl₂·H₂0 | 0.25 |
| H₃BO₃ | 0.56 |
| ZnSO₄·H₂0 | 0.2 |
| (NH₄)₆Mo₇O₂₄·4H₂0 | 0.002 |

The inoculum was grown at 28° C. with agitation for 48 hours.

Five 250 ml. Erlenmeyer flasks were prepared, each containing 30 ml. of production medium of the following composition:

C.

| Basil Production Medium | Amount |
|---|---|
| Glucose | 2.0% |
| L-asparagine | 0.5% |
| D-L methionine | 0.1% |
| Sodium citrate | 0.4% |
| K₂HPO₄ | 0.1% |
| CaCl₂·H₂0 | 0.05% |
| MgSO₄·H₂0 | 0.02% |
| CoCl₂·H₂0 | 0.01% |
| FeSO₄·H₂0 | 0.001% |
| Trace elements*** | | pH=7.0

***As defined above

An aqueous solution of monosodium glutamate was then added to the flasks to give a final concentration of monosodium glutamate as listed in the table below. These flasks were sterilized, cooled and inoculated by adding 0.5 ml. of the seed medium prepared as described above. The inoculated flasks were incubated at 28° C. on a rotary shaker operating at 220 r.p.m. for 72 hours. The contents of each flask were centrifuged and the broth was decanted from the solids. The broth was then diluted with 0.05 M tris-HCl buffer (pH 8.0), and the broths were assayed using *Proteus vulgaris* MB-838 as the test organism. The assays with the broth obtained after incubation for 72 hours are shown below:

D.

| Medium | Millimoles/liter Added Monosodium Glutamate | γ/ml. Antibiotic |
| --- | --- | --- |
| Basal Production | 0 | 10.8 |
| Basal Production | 0.6 | 10.4 |
| Basal Production | 3.0 | 12.6 |
| Basal Production | 6.0 | 18.4 |
| Basal Production | 12.0 | 22.3 |

EXAMPLE 4

The production of (−)(cis-1,2-epoxypropyl-phosphoric acid was carried out as outlined in example 3. The following assay results showing the effect of the addition of various carboxylic acids to the fermentation medium were obtained:

| Medium | Acid added* | Amount, Millimoles/ liter | Antibiotic, μg./ml. |
| --- | --- | --- | --- |
| Basal production | None | 0 | 12.0 |
| Do | Glutamate | 6.0 | 19.7 |
| Do | Fumarate | 6.0 | 18.5 |
| Do | Succinate | 6.0 | 16.2 |
| Do | α-Ketoglutarate | 6.0 | 17.4 |
| Do | Malate | 6.0 | 19.7 |
| Do | *Cis*-oxalacetate | 6.0 | 19.1 |

*Additions were as the sodium salts.

EXAMPLE 5

The production of (−)(cis-1,2-epoxypropyl)-phosphonic acid was carried out as outlined in example 3. The following assay results showing the effect of the addition to the fermentation medium of various carboxylic acids alone in combination with glutamic acid on the production of the antibiotic were obtained. Growth of the micro-organism in the fermentation flasks was measured as the dry weight of mycelia per milliliter of culture broth.

| Medium | Carboxylic acid added** | Amount, millimoles/ liter | Growth dry weight, mg./ml. | Antibiotic, μg./ml. |
| --- | --- | --- | --- | --- |
| Basal production | None | | 6.8 | 8.6 |
| Do | Glutamate | 6.0 | 4.8 | 16.2 |
| Do | Acetate | 6.0 | 4.8 | 10.4 |
| Do | Pyruvate | 6.0 | 5.0 | 9.7 |
| Do | Fumarate | 6.0 | 6.8 | 18.6 |
| Do | Succinate | 6.0 | 7.4 | 16.4 |
| Do | α-Keto-glutarate | 6.0 | 6.6 | 16.0 |
| Do | Malate | 6.0 | 6.6 | 24.5 |

Table — Continued

| | | | | |
| --- | --- | --- | --- | --- |
| Do | *Cis*-oxal-acetate | 6.0 | 6.5 | 15.9 |
| Do | Glutamate + acetate | 6.0 | 6.2 | 20.2 |
| Do | Glutamate + pyruvate | 6.0 | 7.2 | 23.0 |
| Do | Glutamate + fumarate | 6.0 | 6.1 | 23.8 |
| Do | Glutamate + succinate | 6.0 | 6.8 | 22.4 |
| Do | Glutamate + α-keto-glutarate | 6.0 | 7.0 | 23.0 |
| Do | Glutamate + malate | 6.0 | 6.7 | 23.0 |
| Do | Glutamate + oxal-acetate | 6.0 | 7.0 | 21.4 |

**Additions were as the sodium salts.

As can be seen from the above, none of the acids had either a significant stimulatory or inhibitory effect on the growth of the micro-organism.

EXAMPLE 6

The production of (−)(cis-1,2-epoxypropyl)-phosphonic acid was carried out as outlined in example 3. The following assay results showing the effect of glutamic, malic, and fumaric acids on the production of the antibiotic were obtained. Growth of the micro-organism in the fermentation flasks were measured as the dry weight of mycelia per milliliter of culture broth.

| Medium | Carboxylic acid added* | Amount, millimoles/ liter | Growth dry weight, mg./ml. | Antibiotic, μg./ml. |
| --- | --- | --- | --- | --- |
| Basal production | None | 0 | 7.5 | 15.3 |
| Do | Glutamate | 6.0 | 7.1 | 29.0 |
| Do | L-malate | 0.6 | 7.4 | 15.2 |
| Do | do | 6.0 | 5.7 | 24.8 |
| Do | do | 60.0 | 7.5 | 7.7 |
| Do | Fumarate | 0.6 | 8.0 | 16.0 |
| Do | do | 6.0 | 5.7 | 23.9 |
| Do | do | 60.0 | 6.6 | 8.9 |

*Additions were as the sodium salts.

What is claimed is:

1. In the process for the production of (−(cis-1,2-epoxypropyl)-phosphonic acid by growing a (−(cis-1,2-epoxypropyl)-phosphonic acid producing strain of *Streptomyces* from the group consisting of *S. fradiae*, *S. wedmorensis* and *S. viridochromogenes* in an aqueous nutrient medium under aerobic conditions to produce said antibiotic, the improvement which comprises growing said *Streptomyces* in a nutrient medium containing at least one organic acid from the group consisting of glutamic, fumaric, succinic, α-ketoglutaric, malic, oxalacetic, aconitic, isocitric, acetic and pyruvic acids in an amount equivalent to 3 to 12 millimoles per liter to produce enhanced yields of (−)(cis-1,2-epoxypropyl) acid.

2. The process according to claim 1, wherein the *Streptomyces* is a strain of *Streptomyces fradiae*.

3. The process according to claim 1 wherein the *Streptomyces* is a strain of *Streptomyces wedmorensis*.

4. The process according to claim 1 wherein the *Streptomyces* is a strain of *Streptomyces viridochromogenes*.

* * * * *

UNITED STATES PATENT OFFICE
CERTIFICATE OF CORRECTION

Patent No. 3,616,245            Dated October 26, 1971

Inventor(s) Edward O. Stapley, et al

It is certified that error appears in the above-identified patent and that said Letters Patent are hereby corrected as shown below:

Claim 1, column 10, line 56 "(-) (cis-1,2-epoxypropyl) acid" should read -- (-) (cis-1,2-epoxypropyl) phosphonic acid -- .

Signed and sealed this 10th day of October 1972.

(SEAL)
Attest:

EDWARD M. FLETCHER, JR.
Attesting Officer

ROBERT GOTTSCHALK
Commissioner of Patents